United States Patent [19]
Sipos et al.

[11] 3,886,134
[45] May 27, 1975

[54] ANALOGUES OF ANGIOTENSIN II
[75] Inventors: Frank Sipos, Norwich; Donald T. Pals, Oxford; George S. Denning, Norwich, all of N.Y.
[73] Assignee: Morton-Norwich Products, Inc., Norwich, N.Y.
[22] Filed: June 4, 1970
[21] Appl. No.: 43,595

Related U.S. Application Data
[63] Continuation-in-part of Ser. No. 17,920, March 9, 1970, abandoned.

[52] U.S. Cl.............................. 260/112.5; 424/177
[51] Int. Cl.[2]........................................ C07C 103/52
[58] Field of Search................................ 260/112.5

[56] References Cited
UNITED STATES PATENTS
2,978,444   4/1961   Schwyzer et al.................. 260/112.5
3,014,023  12/1961   Schwyzer et al.................. 260/112.5
3,040,017   6/1962   Schwyzer et al.................. 260/112.5
3,281,406  10/1966   Schwyzer et al.................. 260/112.5

OTHER PUBLICATIONS
Bumpus et al., Biochim. Biophys. Acta 46, 38–44 (1961).
Park et al., Biochemistry (Wash.) 6, 3458–3464 (1967).
Bumpus et al., *Peptides:Chemistry and Biochemistry*, Weinstein et al., eds. Marcel Dekker, Inc., New York (1970) pp. 127–150 Effective date Aug. 1968.
Schroder et al., *The Peptides*, Vol. II, Academic Press, New York (1966), pp. 47–62.
Khairallah et al., J. Med. Chem. 13, 181–184 (1970).
Khosla et al., Biochemistry (Wash.) 2, 3417–3421 (1968).

*Primary Examiner*—Elbert L. Roberts
*Attorney, Agent, or Firm*—Anthony J. Franze

[57] ABSTRACT
Novel hepta- and octapeptides of the formula:

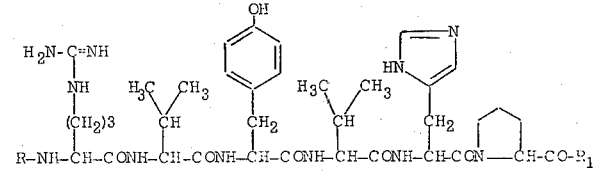

wherein R is hydrogen, succinyl, L-aspartyl, L-sarcosyl, L-seryl, succinamyl, or D- or L-asparaginyl and $R_1$ is an L-alanine, L- or D-leucine, glycine or L-isoleucine residue upon intravenous infusion to animals inhibit blood pressure response to angiotensin amide.

14 Claims, No Drawings

ANALOGUES OF ANGIOTENSIN II

This application is a continuation-in-part of our co-pending application Ser. No. 17.920, filed Mar. 9, 1970 and now abandoned.

This invention relates to polypeptides. More particularly it is concerned with hepta- and octapeptides of the formula:

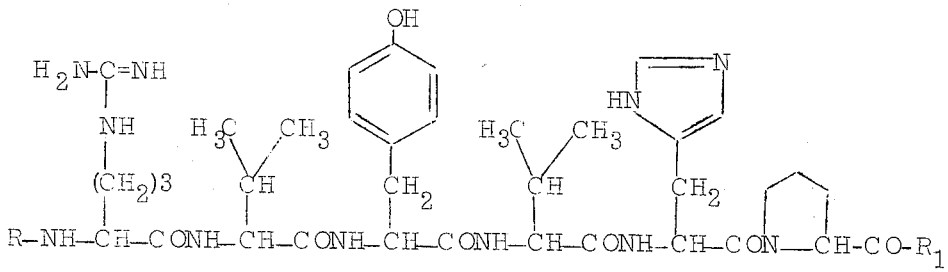

wherein R is hydrogen, succinyl, L-aspartyl, sarcosyl, L-seryl, succinamyl, or D- or L-asparaginyl and $R_1$ is an L-alanine, L- or D-leucine, glycine or L-isoleucine residue.

The peptides of this invention possess pharmacological activity. They are capable of inhibiting the pressor effect of angiotensin amide upon blood pressure. Thus when administered by intravenous infusion to pithed rats in the very small amount of 20 mcg./kg./min., the pressor effect of angiotensin amide similarly administered is inhibited. By virute of this inhibitory property upon angiotensin amide induced blood pressure elevation, the peptides of this invention are valuable agents for counteracting hypertension due to angiotensin amide. They are also capable of inhibiting hypertension in acute unilateral renal hypertensive rats upon intravenous infusion.

The hepta- and octapeptides of this invention are readily prepared in accordance with known methods for preparing peptides. Such methods involve the building of a linear chain of amino acids through repetitive amide linkages employing in such sequential alignment the necessary protective groups susceptible of ready removal by conventional cleavage methods. The adaptation of such methods to the peptides of this invention is described hereinafter in exemplary fashion by the following:

L-Asparaginyl-L-arginyl-L-valyl-L-tyrosyl-L-valyl-L-histidyl-L-prolyl-L-alanine:
BOC-Asn-Arg($NO_2$)-Val-Tyr(O-Bzl)-Val-His($N^{im}$-Bzl)-Pro-Ala-polymer(A)

BOC-Ala-reinester (5 g, 0.5 mMol/g) was placed in a rocking type 200 ml Merrifield reaction vessel. The resin was swelled in chloroform (analytical grade) by rocking for 20 min. and thereafter washed with three 50 ml portions of glacial acetic acid. The duration of each wash operation was 3–5 min. The t-butoxycarbonyl(BOC) protecting group was removed by IN HCl in anhydrous acetic acid by rocking for 40 min. The resin was successively washed three times each with acetic acid, absolute ethanol and with N,N'-dimethylformamide. The resulting hydrochloride of alanylresinester was neutralized with a 10% solution of triethylamine in dimethylformamide by rocking for 10 min. Thereafter the resin was washed with three portions each of dimethylformamide, abs. ethanol, chloroform and methylenechloride and the solution of 8.5 mMol (three fold excess) of BOC-proline in 40 ml. of methylenechloride was added. A 20 min. rocking period was allowed to give time for the amino acid derivative to penetrate the resin. Then 8.5 mMol. of N,N'-dicyclohexylcarbodiimide (DCC) in 10 ml. methylenechloride was added and the coupling was allowed to proceed for 12 hours with rocking. Thereafter the resin was washed with three portions each of methylenechloride, absolute ethanol and acetic acid and so was prepared for the next deprotection step with HCl in acetic acid as described above. The washing, neutralization and coupling steps were performed by the described method using BOC-His($N^{im}$-Bzl)-OH, BOC-Val-OH, BOC-Tyr(O-Bzl)-OH and BOC-Arg($NO_2$)-OH. Change was made in the coupling steps of the BOC-His($N^{im}$-Bzl)-OH and BOC-Arg($NO_2$)-OH in which cases a dimethylformamide-methylenechloride (2:1) mixture was used as solvent. The coupling of Asn to the deprotected resin-heptapeptide was performed using BOC-Asn-ONP (BOC-Asparagine-p-nitrophenylester) in dimethylformamide by rocking the mixture for 72 hours.

After the last coupling step the resin-peptide was washed with dimethylformamide, ethanol, acetic acid and ethanol and dried in vacuo over $P_2O_5$. The weight of the resin-peptide was 7.3 g.
H-Asn-Arg($NO_2$)-Val-tyr(O-Bzl)-Val-His($N^{im}$-Bzl)-Pro-Ala-OH·2HBr (B)

The resin-peptide I (7.3 g), prepared as described above, was suspended in 25 ml. dry trifluoroacetic acid and a stream of dry HBr was passed through at a slow rate. After 20 min. the resin was filtered off and treated once more with HBr/$CF_3COOH$ for 40 min. The filtrates were evaporated to dryness in vacuo at 20°, the oily residues were precipitated with abs. ether and the product was dried in desiccator over potassium hydroxide. The overall yield was 1980 mg. (59.8%) of the protected octapeptidedihydrobromide.
H-Asn-Arg-Val-Tyr-Val-His-Pro-Ala-OH (C)

The protected peptide (B) (1.0 g) was dissolved in 20 ml. of an acetic acid-dioxane-water (4:4:1, v/v) mixture and hydrogenolysed over Pd/$BaSO_4$ (10% catalyst (0.5 g) for 48 hrs. at atmospheric pressure. After that time a new portion (0.2 g) of catalyst was added and the hydrogenation was continued for 24 hours. The filtered and diluted solution was lyophilized. The yield was 750 mg. (m.p. 150°–165°). (Calcd. for dihydrobromide: 15.32% Br. Found: 13.36% Br.)

The crude product was purified by gel permeation chromatography on Sephadex G-25 in 0.2 M acetic acid. The fractions containing the pure peptide were combined and lyophilized. The purified compound contains only a trace of halogen.

TLC: Merck Cellulose F plates, n-butanol-acetic acid-water (6:2:3 v/v) solvent system, $R_f$ 0.35
Merck Silica Gel F-254 plates with the same solvent system, $R_f$ 0.13
$[\alpha]_D^{20} = -59.4$ ($c = 0.2$, IN Ac OH) $[\alpha]_{578}^{20} -61.1$ ($c = 0.2$, IN Ac OH)

Amino Acid Analysis:
Ala: 1.00; Arg: 1.00; Asn: 1.09; His: 0.90; Pro: 1.04;
Tyr: 0.75; Val: 1.94.

In similar fashion other peptides of this invention were prepared introducing at the appropriate stage the requisite unit. The peptides thus prepared are set forth in the tables herebelow:

TABLE I

| Peptide<br>Formula, mol. weight | Specific Rotation<br>(Concentration and solvent) | TLC on Merck Silica Gel F-254 plates<br>butanol-acetic acid-water (6:2:3 v/v); ninhydrin detection<br>$R_f$ | TLC on Merck Cellulose F plates<br>$R_f$ |
|---|---|---|---|
| H-asn-Arg-Val-Tyr-Val-His-Pro-Ala-OH<br>[$C_{43}H_{66}N_{14}O_{11}$, m.w. 955.1] | $[\alpha]_D^{23} = -81.33$<br>(c = 0.22, IN Ac OH) | 0.05 | 0.15 |
| H-Asn-Arg-Val-Tyr-Val-His-Pro-Leu-OH<br>[$C_{46}H_{72}N_{14}O_{11}$, m.w. 997.2] | $[\alpha]_D^{23} = -70.55$<br>(c = 1, IN Ac OH) | 0.15 | 0.34 |
| H-asn-Arg-Val-Tyr-Val-His-Pro-Leu-OH<br>[$C_{46}H_{72}N_{14}O_{11}$, m.w. 997.2] | $[\alpha]_D^{26} = -87.32$<br>(c = 0, 2, IN Ac OH) | 0.10 | 0.45 |
| Succinyl-Arg-Val-Tyr-Val-His-Pro-Ala-OH<br>[$C_{43}H_{64}N_{12}O_{12}$, m.w. 941.1] | $[\alpha]_D^{23} = -64.90$<br>(c = 1, IN Ac OH) | 0.28<br>(Pauly's reagent) | 0.50<br>(Pauly's reagent) |
| H-Asp-Arg-Val-Tyr-Val-His-Pro-Ala-OH<br>[$C_{43}H_{65}N_{13}O_{12}$, m.w. 956.1] | $[\alpha]_D^{20} = -101.62$<br>(c = 0, 3, IN Ac OH) | 0.04 | 0.05 |
| H-Arg-Val-Tyr-Val-His-Pro-Ala-OH<br>[$C_{39}H_{60}N_{12}O_9$, m.w. 841.0] | $[\alpha]_D^{20} = -68.31$<br>(c = 0.3 IN Ac OH) | 0.22 | 0.38 |

TABLE II

| Peptide<br>(Formula, mol. weight) | Specification Rotation<br>Concentration, Solvent | TLC on Merck Silica Gel F-254 Plates (ninhydrin detection) | |
|---|---|---|---|
| | | butanol-acetic acid-water (6:2:3: v/v) | butanol-acetic acid-pyridine-water (9:2:7:6: v/v) |
| H-Sar-Arg-Val-Tyr-Val-His-Pro-Ala-OH<br>($C_{42}H_{65}N_{13}O_{10}$, m.w. 912.11) | $_D^{23} = -84.41$;<br>(c=0.2, IN Ac OH) | 0.05 | 0.30 |
| H-Ser-Arg-Val-Tyr-Val-His-Pro-Ala-OH<br>($C_{42}H_{65}N_{13}O_{11}$, m.w. 928.11) | $_D^{24} = -69.00$;<br>(c=0.2, IN Ac OH) | 0.02 | 0.25 |
| H-Asn-Arg-Val-Tyr-Val-His-Pro-leu-OH<br>($C_{46}H_{72}N_{14}O_{11}$, m.w. 997.22) | $_D^{19} = -54.40$;<br>(c=0.25, IN Ac OH) | 0.15 | 0.50 |
| Succinamyl-Arg-Val-Tyr-Val-His-Pro-Ala-OH<br>($C_{43}H_{65}N_{13}O_{11}$, m.w. 940.12) | $_D^{21} = -83.14$;<br>(c=0.25, IN Ac OH) | 0.10 | 0.20 |
| H-Asn-Arg-Val-Tyr-Val-His-Pro-Gly-OH<br>($C_{42}H_{64}N_{14}O_{11}$, m.w. 941.11) | $_D^{23} = -54.90$;<br>(c=1.0, IN Ac OH) | 0.10 | 0.25 |
| H-Asn-Arg-Val-Tyr-Val-His-Pro-Ile-OH<br>($C_{46}H_{72}N_{14}O_{11}$, m.w. 997.22) | $_D^{17} = -55.33$;<br>(c=0.3, IN Ac OH | 0.40 | 0.52 |

In the above tables, in accordance with IUPAC nomenclature for polypeptides, L-amino acids are denoted by a first capital letter, while D-amino acids are denoted by a first lower case letter.

What is claimed is:

1. A peptide of the formula:
R-L-arginyl-L-valyl-L-tyrosyl-L-valyl-L-histidyl-L-prolyl-$R_1$ wherein R is hydrogen, succinyl, L-aspartyl, sarcosyl, L-seryl, succinamyl, or D- or L-asparaginyl and $R_1$ is L-alanine, L- or D-leucine, glycine or L-isoleucine.

2. The compound of claim 1 wherein R is hydrogen and $R_1$ is L-alanine.

3. The compound of claim 1 wherein R is L-asparaginyl and $R_1$ is L-alanine.

4. The compound of claim 1 wherein R is D-asparaginyl and $R_1$ is L-alanine.

5. The compound of claim 1 wherein R is L-asparaginyl and $R_1$ is L-leucine.

6. The compound of claim 1 wherein R is D-asparaginyl and $R_1$ is L-leucine.

7. The compound of claim 1 wherein R is L-aspartyl and $R_1$ is L-alanine.

8. The compound of claim 1 wherein R is succinyl and $R_1$ is L-alanine.

9. The compound of claim 1 wherein R is sarcosyl and $R_1$ is L-alanine.

10. The compound of claim 1 wherein R is L-seryl and $R_1$ is L-alanine.

11. The compound of claim 1 wherein R is L-asparaginyl and $R_1$ is D-leucine.

12. The compound of claim 1 wherein R is succinamyl and $R_1$ is L-alanine.

13. The compound of claim 1 wherein R is L-asparaginyl and $R_1$ is glycine.

14. The compound of claim 1 wherein R is L-asparaginyl and $R_1$ is L-isoleucine.

* * * * *

PO-1050
(5/69)

UNITED STATES PATENT OFFICE
CERTIFICATE OF CORRECTION

Patent No. 3,886,134          Dated May 27, 1975

Inventor(s) Frank Sipos, Donald T. Pals, George S. Denning, Jr.

It is certified that error appears in the above-identified patent and that said Letters Patent are hereby corrected as shown below:

1. Naming of inventors: George S. Denning should be George S. Denning, <u>Jr.</u>

2. In the Abstract in the line beneath the structural formula the "L-" preceding "sarcosyl" should be omitted.

3. In column 2, line 34: "tyr" should be --Tyr--

Signed and Sealed this twenty-third Day of September 1975

[SEAL]

Attest:

RUTH C. MASON
Attesting Officer

C. MARSHALL DANN
Commissioner of Patents and Trademarks